(12) United States Patent
Harrand

(10) Patent No.: US 6,675,256 B1
(45) Date of Patent: Jan. 6, 2004

(54) FAST DRAM CONTROL METHOD AND ADAPTED CONTROLLER

(75) Inventor: Michel Harrand, Saint Egreve (FR)

(73) Assignee: STMicroelectronics S.A., Gentilly (FR)

( * ) Notice: Subject to any disclaimer, the term of this patent is extended or adjusted under 35 U.S.C. 154(b) by 349 days.

(21) Appl. No.: 09/715,904

(22) Filed: Nov. 17, 2000

(30) Foreign Application Priority Data

Nov. 19, 1999 (FR) ............................................ 99 14610

(51) Int. Cl.⁷ ................................................ G06F 12/00
(52) U.S. Cl. .................... 711/105; 711/118; 711/168; 365/49; 365/189.04; 365/230.08
(58) Field of Search ................................ 711/105, 150, 711/118–120, 122, 128–129, 133, 155–169; 365/222–233, 49, 189.04

(56) References Cited

U.S. PATENT DOCUMENTS

| 5,184,320 A | | 2/1993 | Dye ............................ 365/49 |
|---|---|---|---|
| 5,214,777 A | | 5/1993 | Curry, Jr. ..................... 711/155 |
| 5,521,878 A | * | 5/1996 | Ohtani et al. ................ 365/233 |
| 5,544,121 A | * | 8/1996 | Dosaka et al. ............... 365/222 |
| 5,835,442 A | * | 11/1998 | Joseph et al. ........... 365/230.08 |
| 5,887,272 A | * | 3/1999 | Sartore et al. .............. 711/105 |
| 6,249,840 B1 | * | 6/2001 | Peters ........................ 711/105 |

FOREIGN PATENT DOCUMENTS

| GB | A-2 244 157 | 11/1991 | ............ G11C/7/00 |

* cited by examiner

*Primary Examiner*—Nasser G Moazzami
(74) *Attorney, Agent, or Firm*—Wolf, Greenfield & Sacks, P.C.; James H. Morris

(57) ABSTRACT

A method and a memory controller for controlling a DRAM including a memory plane formed with an array of memory cells and at least two cache registers. An access request including a page address, a column address, a write or read order, a possibly data to be written is received. The page address of the current request is compared with the page address of the preceding request and, if they are different, the controller stores the current request page in one non-used of the cache registers, preferably that which has not been used last.

10 Claims, 4 Drawing Sheets

FAST DRAM CONTROL METHOD AND ADAPTED CONTROLLER

BACKGROUND OF THE INVENTION

1. Field of the Invention

The present invention relates to the field of memories, and more specifically to DRAMs.

2. Discussion of the Related Art

Typically, a DRAM includes a memory plane formed with an array of elementary memory cells, a row decoder and a column decoder. Each memory cell is located at the intersection of a row (word line) and of a column (bit line).

The column decoder conventionally includes an input for data writing and an output for data reading. The column decoder is controlled by a column address strobe (CAS), a column address signal (CAD), and a read/write signal generally called R/W.

The row decoder is controlled by a row address strobe (RAS), a row address signal (RAD), and signals used to refresh the memory.

Conventionally still, amplifiers providing access to the memory plane (SENSE AMP) will be located on each bit line, between the memory plane and the column decoder. They enable isolating the memory cells and allow their reading, writing or refreshment.

DRAMs have the advantage of having a large storage density, but, in addition to the fact that a refreshment of the memory cells is necessary, they have the disadvantage of being slow in terms of access time.

As an example, FIG. 1 shows a timing diagram of signal RAS for a conventional DRAM, illustrating the time required to process an access request. It is assumed that at a time t0, the DRAM receives an access request, signal RAS already being at its preload level. The desired data will be accessible at the output of the memory plane at a time t1 only. Then, a time t2 must be awaited for all the desired words of a data row (or word page) to be read at the output of the sense amplifiers (case of a reading) or written into the memory (case of a writing). Only then can signal RAS return to its preload level, where it will have to stay at least during preload time tPR (typically 3 clock cycles) before the memory is available for a new access. Thus, the time between two successive accesses to the memory is t3–t0.

To improve the access time, it has been devised to add to the DRAM a cache memory enabling writing the data of the main memory as soon as they are available, that is, in the preceding example, at time t1, to reset the main memory to preload as soon as the data have been loaded in the cache memory, the data now stored in the cache memory being readable at the user's will. As illustrated in FIG. 2, the main memory is available again for a new request at time t'1, corresponding to time t1 plus preload time tPR, but it must in practice be awaited until the data of the cache memory have been read before being able to have access again to the memory plane. In the example of FIG. 2, a burst of 5 data is shown, and the memory will only be usable at time t2. In terms of access time, the time spared in the example is preload time tPR, since signal RAS no longer needs be set to preload at a time t2. If, however, the data burst has a duration shorter than the preload time (typically less than three data), the memory becomes accessible at time t'1 and, as compared to conventional memories, the time gain is that of the data burst.

It can thus be seen that the DRAM structure with a cache memory improves the time of access to the DRAM, but not significantly. Further, the improvement only concerns the reading, and not the writing. Moreover, in such arrangements, the cache memory often has a limited capacity, which all the more delays the processing of long bursts or of bursts including words distant by a line.

In French patent application "DRAM à structure rapide" filed on Mar. 26, 1998 under number 98/04008, the applicant provides a DRAM including two cache registers for storing a current page and another page of the memory, such as the next memory page, to accelerate the processing of requests. This application above all relates to the circuits forming the memory, and to its refreshment. It does not describe all possibilities of use of the memory and of its cache registers. Neither does it describe a memory controller for controlling the memory.

SUMMARY OF THE INVENTION

An object of the present invention is to provide a method for controlling a DRAM including two cache registers.

Another object of the present invention is to provide a memory controller enabling controlling a DRAM including two cache registers.

To achieve these objects as well as others, the present invention provides a method for controlling a dynamic random access memory (DRAM) including a memory plane formed of an array of memory cells and at least two cache registers. The method includes the steps of:

receiving a request for access to the memory which is part of a sequence of synchronous requests of a clock, said request comprising at least a page address, a column address, a write or read order and, in case of a write request, data to be written, comparing the page address of the current request with the page address of the preceding request, storing, in the case where the page address of the current request is different from that of the preceding request, the new page in one non-used of the two cache registers, preferably that which has not been used last, storing in a storage element the column address and, if present, the data to be written of the current request, to make them available when the page of the current request is itself available in one of the cache registers, and using an output of said storage element to have access, from the considered cache register, to the desired words of the current request page.

According to an embodiment of the present invention, said storage element includes a first register, the content of the first register being transferred to a second register, and the second register is formed of a set of sub-registers forming a shift register, the content of the second register advancing upon each clock pulse towards an output of said second register to delay the column address and the possible data to be written by a duration equal to the time required to load a page, from the memory plane, into one of the cache registers.

According to an embodiment of the present invention, in the case of a reading, the data present at the output of said storage element enable direct access, in the cache register used, to the words located by their column address.

According to an embodiment of the present invention, in the case of a writing, the data present at the output of said storage element enables loading the words to be written into said cache register, the page thus modified remaining stored in said cache register, waiting to be written back upon a next access to the memory plane.

According to an embodiment of the present invention, if no access to the memory plane is required for a reading or a writing, the refreshment of a row of the dynamic memory is performed, the cache registers, isolated from the memory plane, being available for use during the refreshment.

According to an embodiment of the present invention, when the page of the current request is a new page and it cannot be loaded into one of said cache registers, the current request is stored in appropriate means until the loading can occur.

The present invention also provides a memory controller for controlling a DRAM including a memory plane formed with an array of memory cells and at least two cache registers, the controller receiving as an input a request for access to the memory, said request being part of a sequence of synchronous requests of a clock and comprising at least a page address, a column address, a write or read order and, in case of a write request, data to be written. The controller includes a control block adapted to managing the controller operation and to providing signals of access to the memory plane. The controller further includes:

a comparator associated with a memory element for comparing the page address of the current request with the page address of the preceding request, a storage element for storing the column address and, if present, the data to be written of the current request, and for delaying these data by the time required to load a page into one of the cache registers from the memory plane, so that the column address and the possible associated data of the current request are made available when the content of the page of the current request is itself available in one of the cache registers.

According to an embodiment of the present invention, the storage element includes:

a first register for storing the column address and, if present, the data to be written of the current request, and a second register, receiving as an input the output of said first register and providing as an output control signals of the cache registers, said second register being formed of a set of n sub-registers forming a shift register, the number of the sub-registers being chosen to delay the data at the output of the second register by the time required to load a page into one of the cache registers from the memory plane, so that the column address and the possible associated data of the current request are made available when the content of the page of the current request is itself available in one of the cache registers.

According to an embodiment of the present invention, the number of sub-registers depends on the clock frequency and on the time of access to the DRAM, this number being equal to 4 when the clock frequency is 200 MHz and the time of access to the DRAM is 20 nanoseconds.

According to an embodiment of the present invention, the controller further includes an additional memory, for example of FIFO type, for receiving the requests as an input, said memory being adapted to queuing the requests.

The foregoing objects, features and advantages of the present invention, will be discussed in detail in the following non-limiting description of specific embodiments in connection with the accompanying drawings.

DETAILED DESCRIPTION

Figure 1:
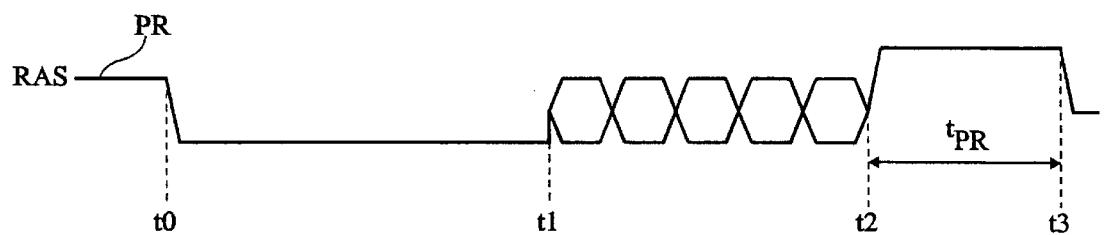
FIG. 1, previously described, is a timing diagram illustrating the time required by the processing of a request in the case of a conventional DRAM.
Figure 2:
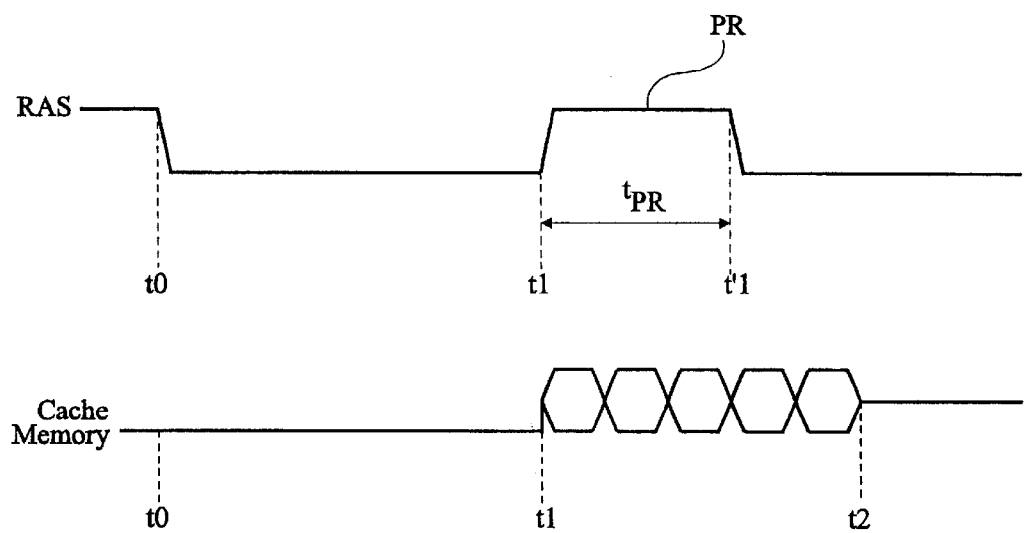
FIG. 2, previously described, is a timing diagram illustrating the time required by the processing of a request in the case of a DRAM associated with a cache memory.
Figure 3:
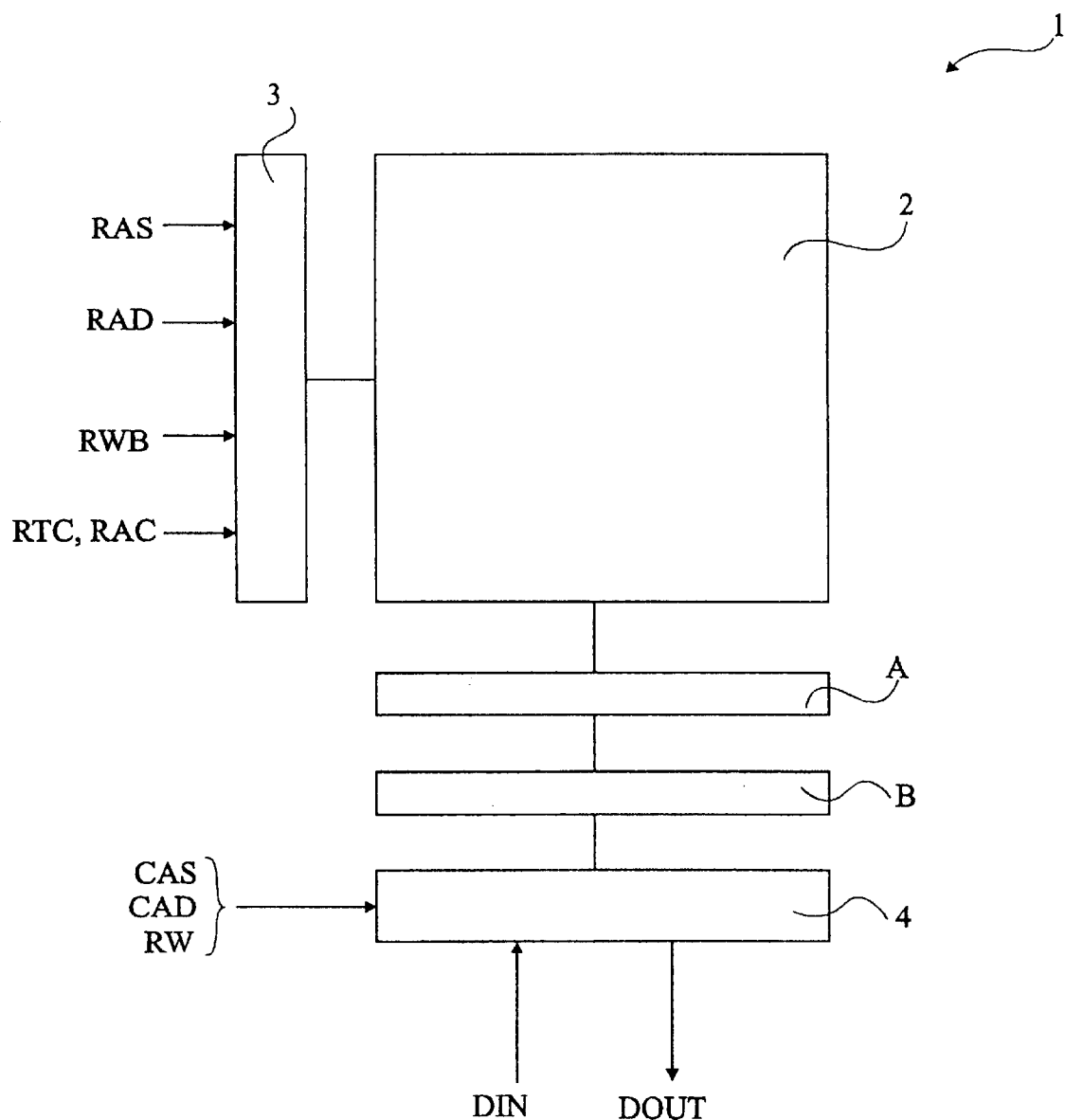
FIG. 3 illustrates a DRAM memory including two cache registers.

FIG. 3 illustrates a DRAM 1. This memory conventionally includes a memory plane 2 formed of an array of memory cells, a row decoder 3, and a column decoder 4. For simplicity, the sense amplifiers located on each bit line at the output of the memory plane have not been shown.

The column decoder conventionally includes an input DIN for the writing and an output DOUT for the reading of data.

The column decoder is controlled by the column address strobes (CAS), the column address signals (CAD) and the read/write signals (R/W), and the row decoder is controlled by the row address strobes (RAS), the row address signal signals (RAD), and a row write-back signal (RWB), the function of which will be explained hereafter.

Memory 1 also includes two cache registers A and B located between memory plane 2 and column decoder 4 (or, more specifically, between the sense amplifiers and the column decoder). Cache registers A and B, which are fast access memories, behave as interfaces between the memory plane, on the one hand, and input DIN and output DOUT on the other hand. They can store an entire row of the memory plane, that is, a complete word page. Thus, if the memory plane is an array of 1024×1024 bits, each of cache registers A and B can store an entire row of 1024 bits, that is, for example, a page of 16 words of 64 bits, or of 32 words of 32 bits.

In the present use of DRAM 1, the data stored in memory plane 2 are only accessible via cache registers A and B, the memory plane being isolated, or in communication with one of the cache registers. The cache registers are managed independently from each other and can be either isolated from the memory plane, or in communication therewith. They can also, when isolated from the memory plane, be in communication with a user system via terminals DIN and DOUT.

The advantages of the preceding mode of use are many.

A word page can for example be loaded into cache register A while the user system has access to the data previously loaded into cache register B, to read them or modify them. If data are modified in register B, it will be easy to write back the modified page contained in register B in a subsequent access to the memory plane, for example during the access to the data of the other cache register (A). It can be easily understood that such an architecture, which enables delaying the access to the data and their processing, actually ensures a masking of the time of access to the memory plane and provides a significant time gain for read and write operations.

Further, if none of the cache registers is in communication with the memory plane, the memory can be refreshed and, if the available time is sufficient, the time required for the refreshment will be totally masked, as will be seen hereafter, which results in an additional time gain.

Further, since an entire page, that is, an entire word line, is transferred from the memory plane to one of cache register A and B, all the words in the page are immediately available by a having access to the considered cache register. Said register being isolated from the memory plane after the data have been loaded, its content can be read or modified. As long as the request will relate to the same page, whatever the number of considered requests, it will be unnecessary to access again the memory plane.

Bursts of widely variable size (from one word to an entire page) can thus be easily processed, in any order, and the times of access to the memory plane are masked, totally or partly, according to the burst length. It is thus possible to obtain as an output a datum for each clock pulse, as in the case of a SRAM (actually, each time the average duration of a burst is greater than the time of access to the memory plane, which is generally the case).

Figure 4:
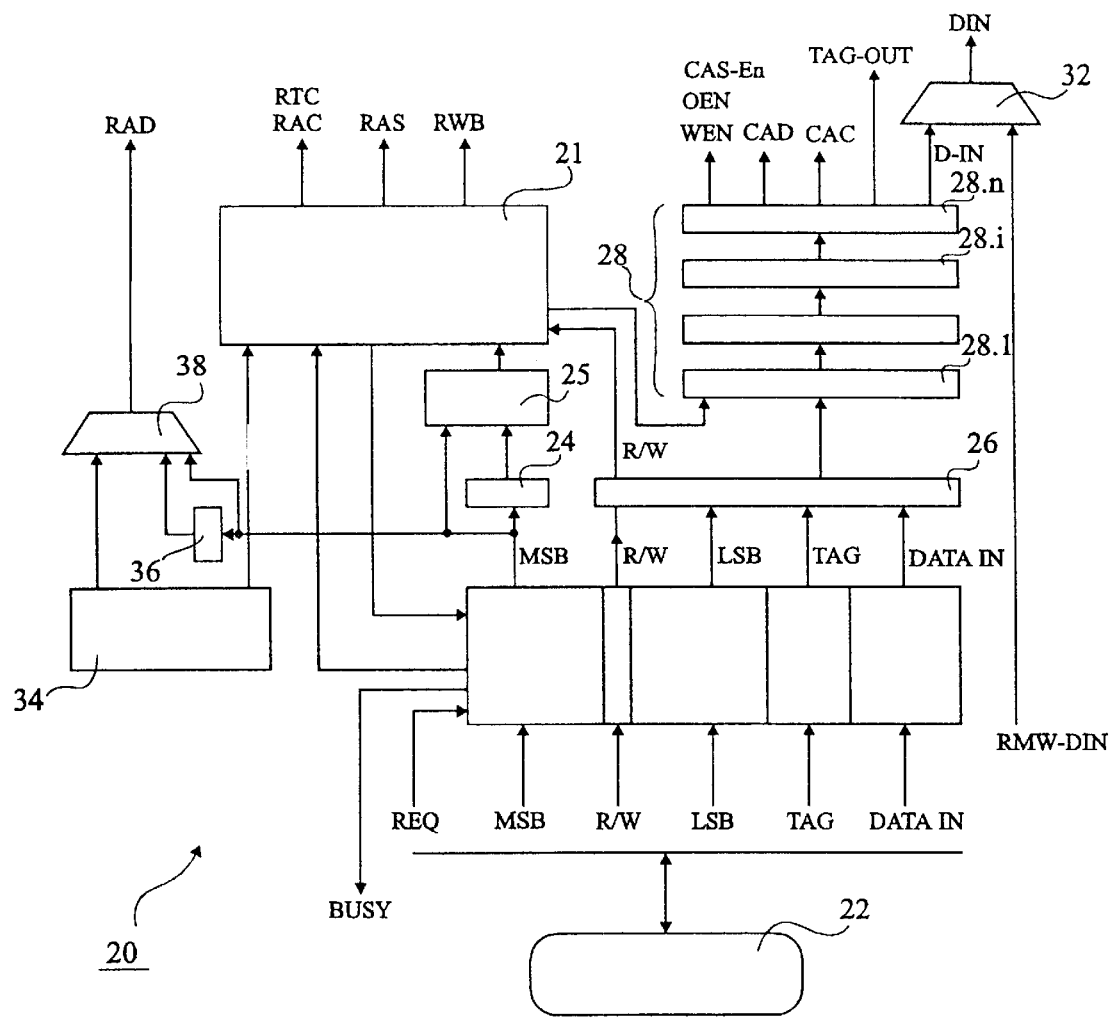
FIG. 4 illustrates a memory controller according to the present invention.

A memory controller according to the present invention will now be described. In FIG. 4, a controller 20 includes a control block 21 providing signals RAS and RWB, as well as signals RTC (Row Transfer Cache) and RAC (Row Access Cache) enabling transferring a row from the memory plane into one of the cache registers and conversely. Signal RTC indicates whether it is a transfer or a refreshment, signal RAC indicates the selected cache register (A or B), and signal RWB indicates the transfer direction (from the memory plane to the cache register or from the cache register to the memory plane). These signals, as well as signals RAD, concern operations involving the DRAM memory plane. Signal RAD originates from a multiplexer 38 controlled by control block 21 and enabling loading of a cache register, writing back of a modified page in the memory plane, and refreshment of a word line of the memory plane, as will be seen hereafter.

Controller 20 receives as an input requests coming from a user interface 22. Such as shown—as an example only—, these requests include a page address MSB (most significant bit), a column address LSB (least significant bit), a signal R/W indicating whether the request is a request to read or write, a data signal (DATA IN), and a signal TAG used in the read mode. Generally, the request also includes a request enable signal (REQ), shown herein, which indicates whether the request is valid or not.

Controller 20 also includes a memory element 24 for storing the page address (MSB) of the preceding request. The controller also includes a comparator 25 for comparing the page address of the current request with that of the preceding request. The result of the comparison is provided to control block 21 that elaborates, among others, signals for controlling the DRAM. Thus, the controller, in case of successive requests relating to the same page, does not address the memory plane again, and it enables the user system to have access to the data of the involved page, already present in one of cache registers A and B. However, if the page address of the current request is different, controller 20 activates an access to the memory plane and has the content of the involved page transferred into one of cache registers A and B.

Controller 20 also includes a first register 26 that receives the column address (LSB), signal R/W, signal TAG and, if present, data DATA IN. The function of this first register 26 is to store the indicated input request elements. Controller 20 also includes a second register 28, formed of a set of sub-registers 28.1, ..., 28.i, ... 28.n forming a shift register. An input of second register 28 is connected to the output of first register 26 and the data of register 26 are transferred into register 28 at the clock pulse following their arrival in register 26. Further, signal R/W is provided to control block 21. Register 28 also receives as an input an output of control block 21 providing various signals for controlling the two cache registers A and B of the DRAM and, at the output of shift register 28, a signal CAS-En (CAS-Enable) is present which, by combination with the clock, generates signal CAS, signals OEN (Output Enable), WEN (Write Enable), signal CAC that selects the cache register, signal TAG-OUT that corresponds to the signal TAG received a few clock pulses before, and signals CAD and D-IN that respectively represent the column address and the data to be written, and correspond to the signals LSB and DATA IN received a few clock pulses before.

The number n of sub-registers of second register 28 must be carefully chosen. Indeed, this number n determines the delay of the column address (CAD) of a request with respect to the page address (RAD) of this same request. Number n of sub-registers must be chosen so that the page determined by address MSB has the time to load into the selected cache register. Number n depends on the processing frequency and on the time of access to the DRAM. Actually, $n=t_{access}/t_{CK}$, $t_{access}$ being the time of access to the DRAM (that is, the duration between the switching of signal RAS to a low level and the time when the data is available) and $t_{CK}$ being the clock period. In the example shown, the clock frequency is 200 MHz, that is, $t_{CK}$=5 nanoseconds, the time of access to the DRAM is 20 nanoseconds, and there are four sub-registers 28.i, the column address being then shifted by four clock cycles with respect to the page address.

As an alternative, second register 28 may be replaced with an appropriate storage element, for example a FIFO memory. This enables immediate selection of a request relating to the current page but arriving after one or several clock cycles without any request, without having to cross registers 28.i. However, this adds complexity to the system, for the storage element as well as for control block 21, which must then manage the output time of the data and addresses of said storage element.

Further, optionally, controller 20 may include an input memory 30, for example a FIFO memory, for storing the received requests when they are enabled (REQ=1). The function of memory 30 is, in case of an overactivity of controller 20, to store a number of access requests waiting to be processed. Memory 30 acts a request queue. Should memory 30 become full, it transmits a busy signal to temporarily stop the arrival of requests.

Optionally still, memory controller 20 may also receive as an input a signal RMW-DIN (read modify write-DIN) enabling insertion of a write modification request. By means of a multiplexer 32, also optional, the data can be taken directly from input RMW-DIN instead of from output DIN of register 28.

Controller 20 also includes a refreshment counter 34, coupled to control block 21 and to multiplexer 38, and a storage element 36 coupled to multiplexer 38, storage element 36 being controlled by control block 21. Multiplexer 38 also provides input RAD of the row decoder either with page address MSB of the current request, or with a page address to be refreshed coming from refresh counter 34, or with the page address of the preceding write request, stored in storage element 36, said page waiting to be written back in the memory plane since it has been modified.

Figure 5:
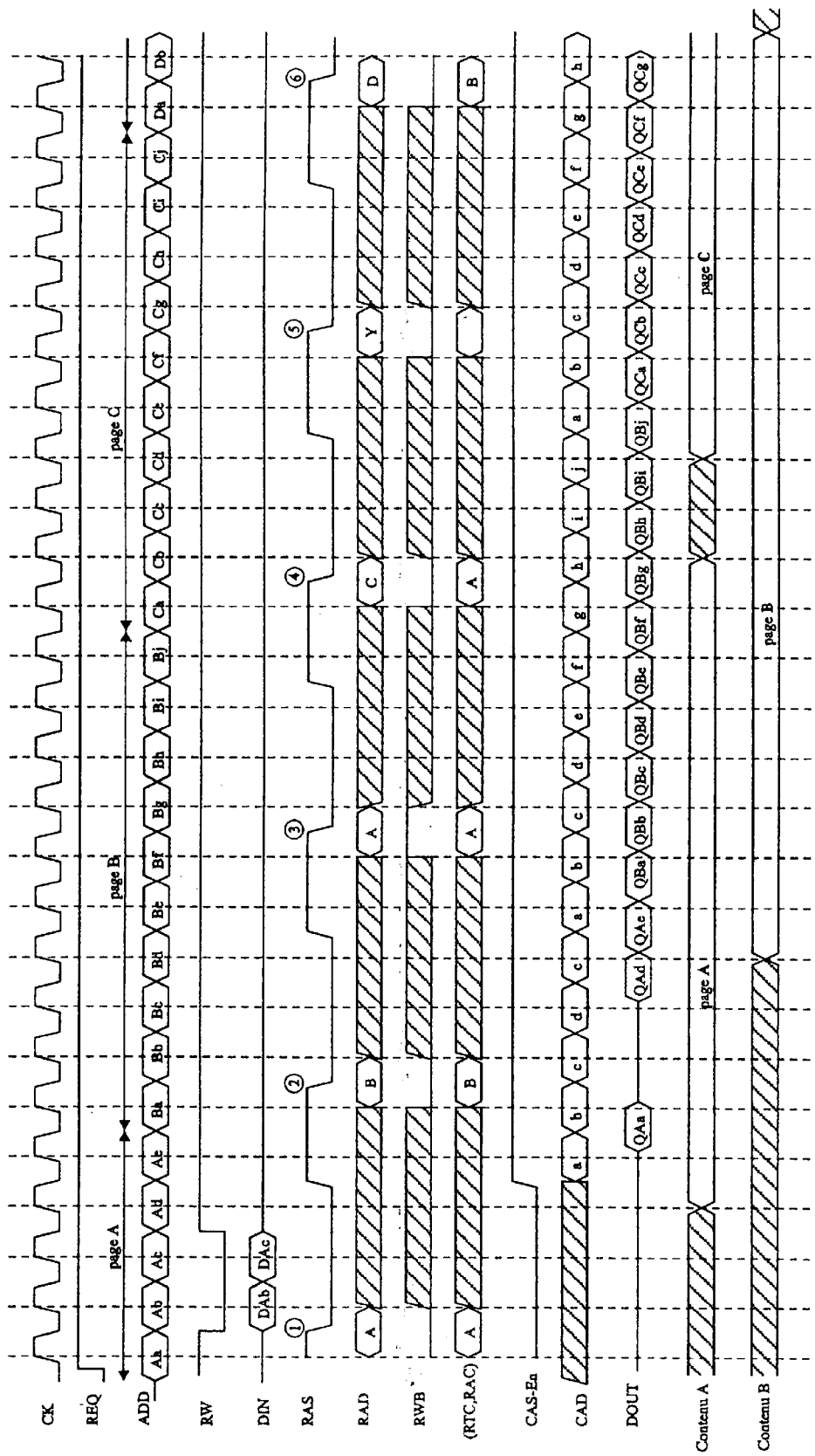
FIG. 5 is a timing diagram illustrating various signals during the DRAM operation.

The operation of controller 20 will be better understood in relation with the description of FIG. 5, which is a timing diagram enabling understanding the DRAM control method.

In FIG. 5, requests are presented synchronously with respect to a clock CK. Signal REQ is always at 1 in the example shown, that is, the requests must all be taken into account. Line ADD represents the page and column addresses of the required words. Thus, Aa means page A, word a, Ab means page A, word b, etc. The next line shows signal RW and indicates that, apart from words Ab and Ac, which are to be written, all other words are to be read. Signal DIN includes data DAb and DAc to be written at addresses Ab and Ac.

The next line of the timing diagram illustrates signal RAS. When signal RAS switches low, a row of the memory plane is accessible. This memory plane row will be written into one of the two cache registers A and B. In practice, the selected cache register is the cache register that has not been selected last. This enables pursuing, if necessary, the use of the register selected last and taking full advantage of the structure of the memory according to the present invention. When the data have been transferred to a cache register, signal RAS returns to its preload level and, when time tPR is over, access can be had to the memory plane again.

Thus, in FIG. 5, at time 1, as indicated by signals RWB on the one hand and RTC, RAC (shown on a same line of the timing diagram for simplicity) on the other hand, the controller causes an access to the memory plane, to load page A into cache register A from the memory plane, the loading of page A into cache register A effectively occurring a few clock pulses later, as illustrated by line "Content A" of FIG. 5.

At time 2, the memory plane is accessible again for a new request and, if necessary, a new page can be written into the other cache register (B). This is what occurs in the illustrated example. The controller, by means of its storage and comparison elements 24 and 25, has determined that the current request involves another page (page B) and it causes the loading of this new page into the cache register that has not been used the preceding time, that is, register B, and page B is available in cache register B a few clock pulses later, as illustrated by line "Content B" of FIG. 5. This enables the controller, during this time, to keep on addressing register A in the read mode and, as can be seen on line CAD, at time 2, word b is written into cache register A, modifying the preceding word b of page A. It should be noted that, in the considered memory, signal CAS is generated internally in the memory by the combination of clock CK and of signal CAS-En, also shown in FIG. 5.

At time 3, the memory plane is available again for an operation. It can be seen that at time 3, the requests still concern words of page B, which is stored in cache register B. Further, cache register A contains data DAb and DAc to be written into the memory plane. The memory plane being unused for the time being, the controller will have the content of cache register A written into memory plane 2.

At time 4, the memory plane is accessible again. This time, a new page C is addressed. Page C will then be loaded from the memory plane into cache register A, which has not been addressed upon the preceding memory access and the loading occurs a few clock pulses later, as illustrated by line "Content A" in FIG. 5.

At time 5, the memory plane is available again. The requests still involve words of page C, which is currently present in cache register A, and no new access to the memory is required. The possibility of access to the memory plane will then be used to perform a refreshment, the refreshed line being defined by refresh counter 34.

At time 6, the refreshment is over. Meanwhile, a request involving a new page (D) has appeared. This page will then be loaded from the memory plane into the cache register that has not been used last, that is, register B.

It can be seen that, in FIG. 5, an uninterrupted output data flow is obtained after a shift of four clock pulses, as in the case of a static memory, and that the times of access to the memory plane are totally masked by the use according to the present invention of two cache registers. Actually, as long as the average duration of the bursts is sufficiently long, the times of access to the memory plane will be masked and, in the case of a particularly long burst (like the burst involving page C), the refreshment of a line can be performed in a totally masked way, without any additional use of time, which is an additional advantage of the present invention.

It should also be noted that the memory controller and the method of the present invention have the advantage that the addresses of a word burst are any word addresses of a given page, the order of these addresses being of little importance. Indeed, since an entire word page is stored in one of the cache registers, the controller enables fast and independent access to each word of the stored page, the addresses of these words having no need to be consecutive or follow any order to be efficiently processed.

Of course, the present invention is likely to have various alterations, modifications, and improvements which will readily occur to those skilled in the art.

In particular, the controller has been described to control a DRAM including a single memory plane; it should be understood that the controller of the present invention could control a DRAM including several memory planes in cascade, each memory plane using a specific row decoder and being connected to the two same cache register A and B, a single column decoder being common to all memory planes.

Also, the memory controller and the method according to the present invention have been described in the context of a single port memory. Modifying the controller and the method of the present invention to apply them to the case of a dual port memory is within the abilities of those skilled in the art, two cache register A and B being present on each of the memory accesses.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for controlling a dynamic random access memory including the steps of:

providing a memory plane, formed of an array of memory cells, and at least two cache registers, wherein any of the cache registers can be used for accessing the memory plane while another is used for read or write operations;

receiving a request for access to the memory which is part of a sequence of synchronous requests of a clock, said request comprising at least a page address, a column address, a write or read order and, in case of a write request, data to be written, comparing the page address of the current request with the page address of the preceding request, storing, in the case where the page address of the current request is different from that of the preceding request, the new page in one non-used of the at least two cache registers, wherein the cache register which has not been used last is preferred to store the new page, storing in a storage element the column address and, if present, the data to be written of the current request, to make them available when the page of the current request is itself available in one of the cache registers, and using an output of said storage element to have access, from the cache register in which the new page is stored, to at least one word of the current request page.

2. The method of claim 1, wherein said storage element includes a first register, the content of the first register being transferred to a second register, and wherein the second register is formed of a set of sub-registers forming a shift register, the content of the second register progressing upon each clock pulse towards an output of said second register to delay the column address and the possible data to be written by a duration equal to the time required to load a page, from the memory plane, into one of the cache registers.

3. The method of claim 1, wherein in the case of a reading, the data present at the output of said storage element enables direct access, in the cache register used, to the at least one word located by its column address.

4. The method of claim 1, wherein, in the case of a writing, the data present at the output of said storage element enable loading the words to be written into said cache register, the page thus modified remaining stored in said cache register, waiting to be written back upon a next access to the memory plane.

5. The method of claim 1, wherein, if no access to the memory plane is required for a reading or a writing, the refreshment of a row of the dynamic memory is performed, the cache registers, isolated from the memory plane, being available for use during the refreshment.

6. The method of claim 1, wherein, when the page of the current request is a new page and it cannot be loaded into one of said cache registers, the current request is stored in appropriate means until the loading can occur.

7. A memory controller for controlling a DRAM including a memory plane formed with an array of memory cells, the controller being configured to access at least two cache registers, wherein any of the cache registers can be used for accessing the memory plane while another is used for read or write operations;

the controller receiving as an input a request for access to the memory, said request being part of a sequence of synchronous requests of a clock and comprising at least a page address, a column address, a write or read order and, in case of a write request, data to be written, the controller including a control block adapted to managing the controller operation and to providing signals of access to the memory plane, and including:

a comparator associated with a memory element for comparing the page address of the current request with the page address of the preceding request, a storage element for storing the column address and, if present, the data to be written of the current request, and for delaying these data by the time required to load a page into one of the cache registers from the memory plane, so that the column address and the possible associated data of the current request are made available when the content of the page of the current request is itself available in one of the cache registers.

8. The memory controller of claim 7, wherein the storage element includes:

a first register for storing the column address and, if present, the data to be written of the current request, and a second register, receiving as an input the output of said first register and providing as an output control signals of the cache registers, said second register being formed of a set of n sub-registers forming a shift register, the number of the sub-registers being chosen to delay the data at the output of the second register by the time required to load a page into one of the cache registers from the memory plane, so that the column address and the possible associated data of the current request are made available when the content of the page of the current request is itself available in one of the cache registers.

9. The memory controller of claim 7, wherein the number of sub-registers depends on the clock frequency and on the time of access to the DRAM, this number being equal to 4 when the clock frequency is 200 MHz and the time of access to the DRAM is 20 nanoseconds.

10. The memory controller of claim 7, further including an additional memory, for receiving the requests as an input, said memory being adapted to queuing the requests.

* * * * *